Feb. 22, 1949.  H. GANZ  2,462,178
TAMPON MACHINE AND METHOD FOR MAKING TAMPONS
Filed Jan. 13, 1944  14 Sheets-Sheet 1

INVENTOR
HENRY GANZ.
BY
Angelo M. Piserra
ATTORNEY

Feb. 22, 1949.    H. GANZ    2,462,178
TAMPON MACHINE AND METHOD FOR MAKING TAMPONS
Filed Jan. 13, 1944    14 Sheets-Sheet 3

INVENTOR
HENRY GANZ.
BY
Angelo M. Pisarro
ATTORNEY

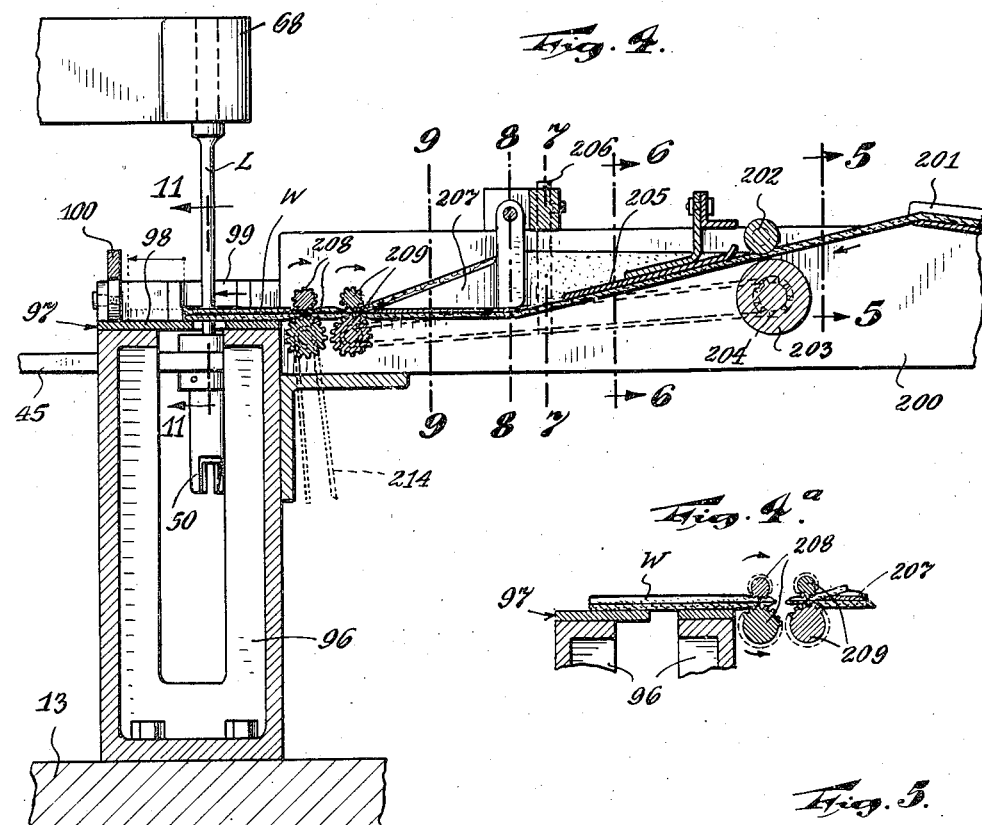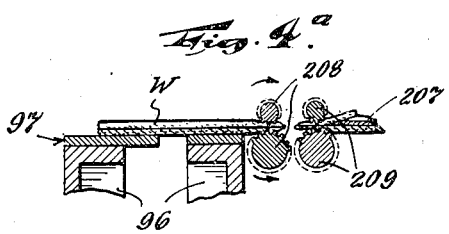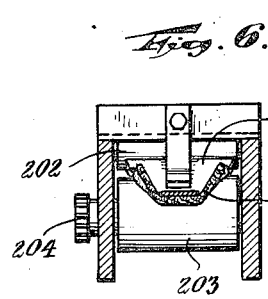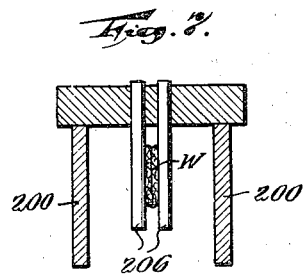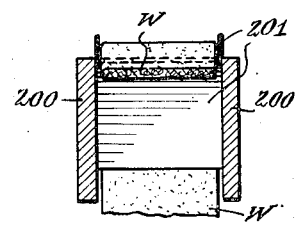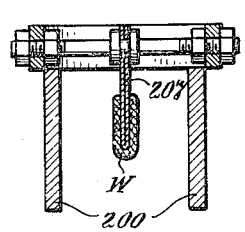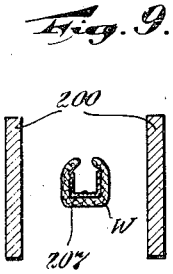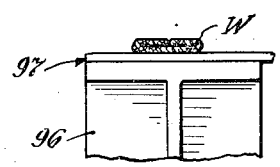

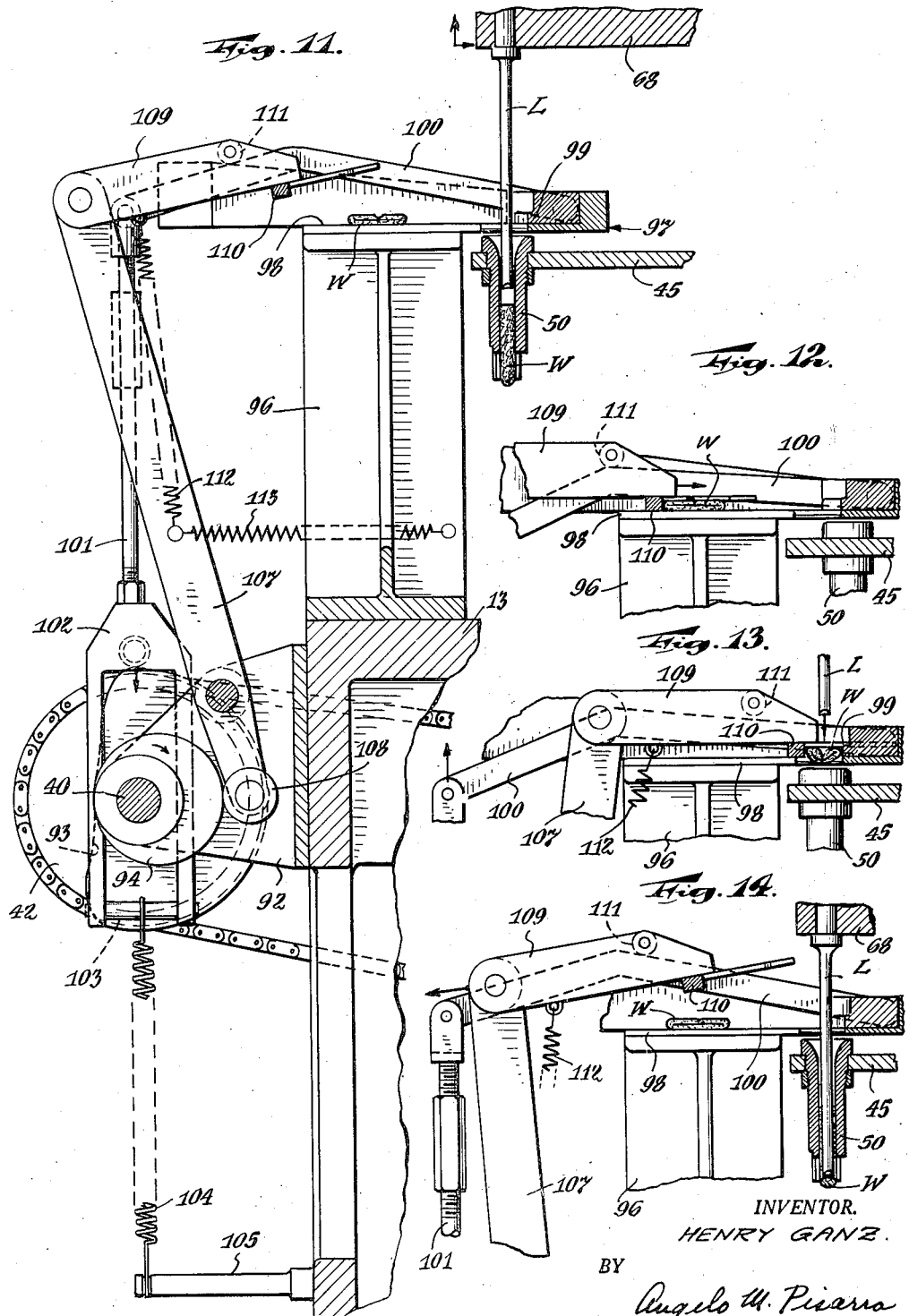

Feb. 22, 1949.  H. GANZ  2,462,178
TAMPON MACHINE AND METHOD FOR MAKING TAMPONS
Filed Jan. 13, 1944  14 Sheets-Sheet 6
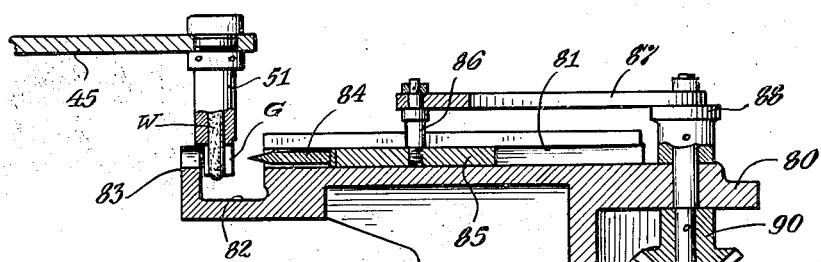
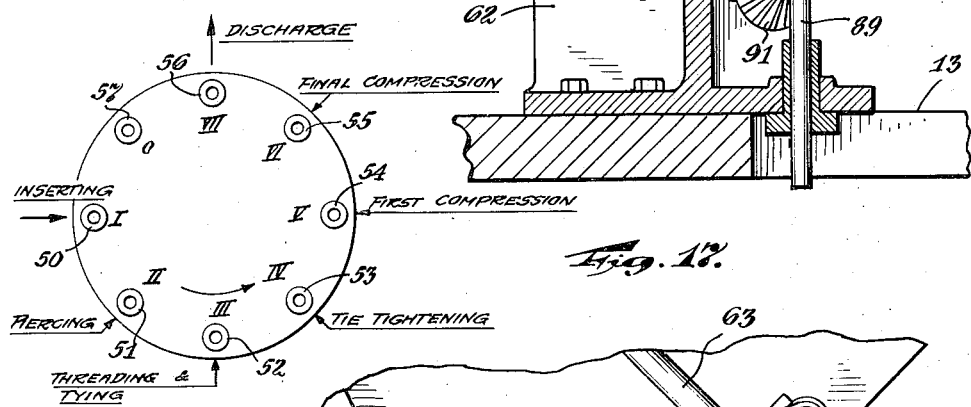
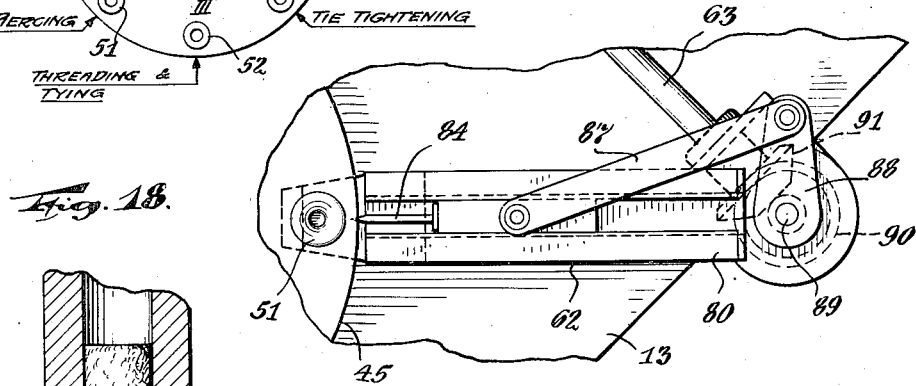
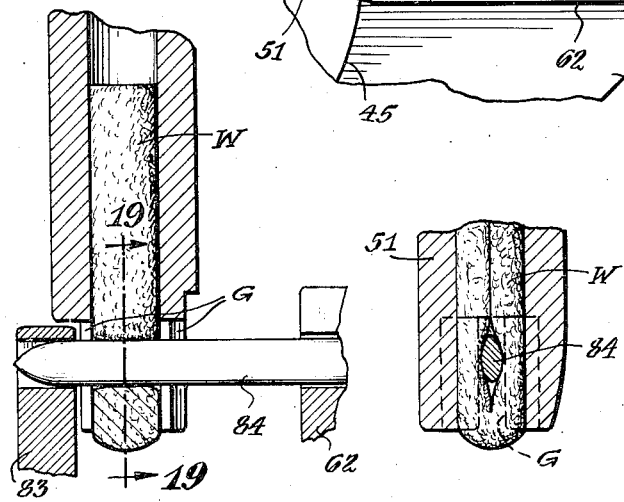
INVENTOR.
HENRY GANZ
BY
Angelo M. Picarro
ATTORNEY Feb. 22, 1949. H. GANZ 2,462,178
TAMPON MACHINE AND METHOD FOR MAKING TAMPONS
Filed Jan. 13, 1944 14 Sheets-Sheet 7
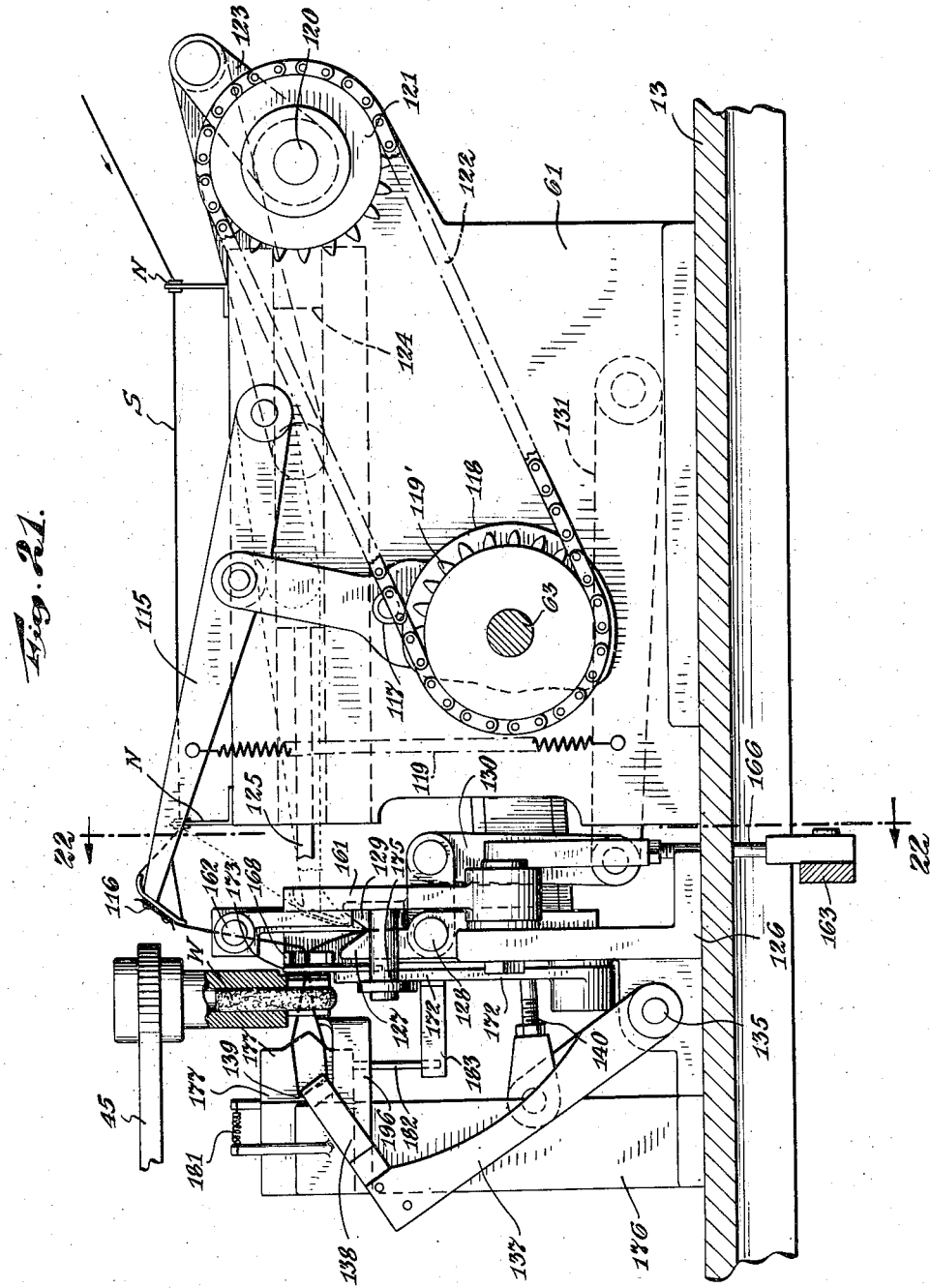
INVENTOR.
HENRY GANZ
BY
Angelo M. Pisarra
ATTORNEY.

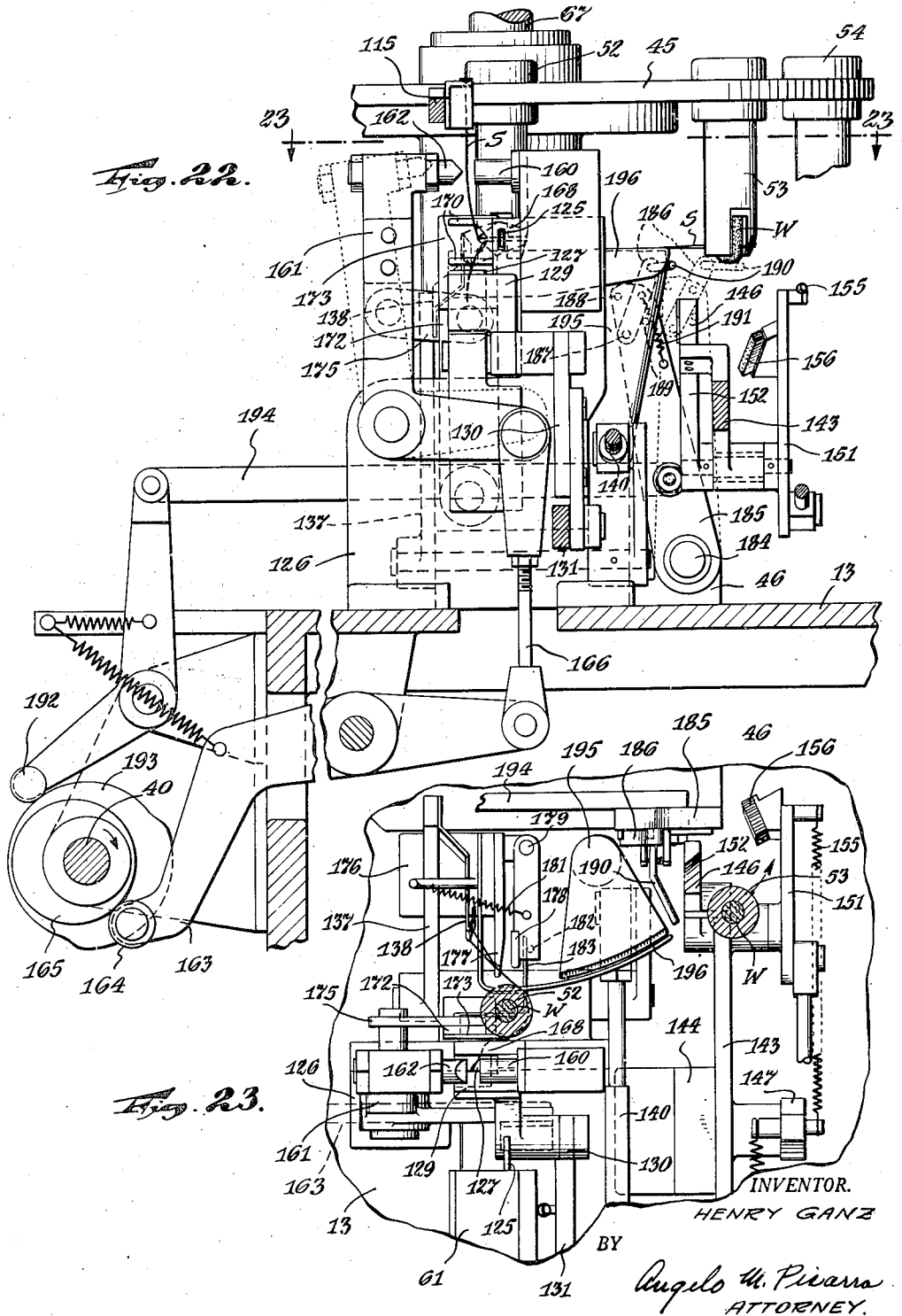

Feb. 22, 1949.   H. GANZ   2,462,178
TAMPON MACHINE AND METHOD FOR MAKING TAMPONS
Filed Jan. 13, 1944   14 Sheets-Sheet 9

INVENTOR.
HENRY GANZ
BY
Angelo M. Pisarra
ATTORNEY.

Feb. 22, 1949. H. GANZ 2,462,178
TAMPON MACHINE AND METHOD FOR MAKING TAMPONS
Filed Jan. 13, 1944 14 Sheets-Sheet 10
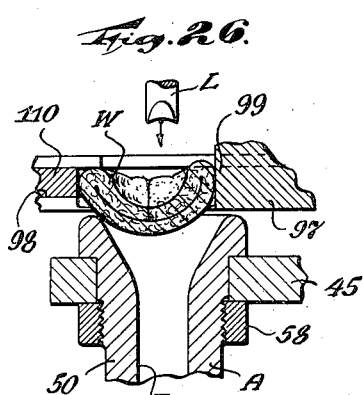
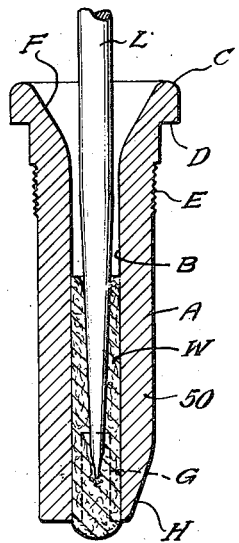
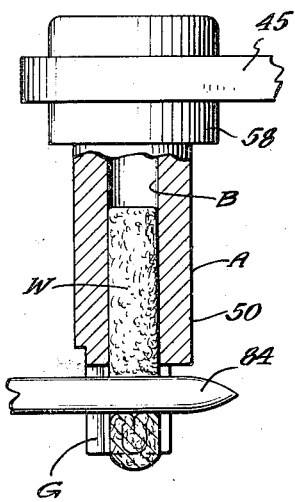
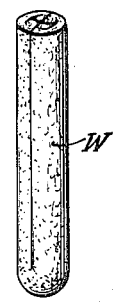
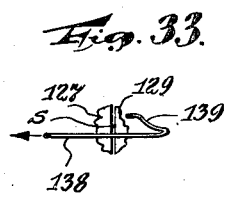
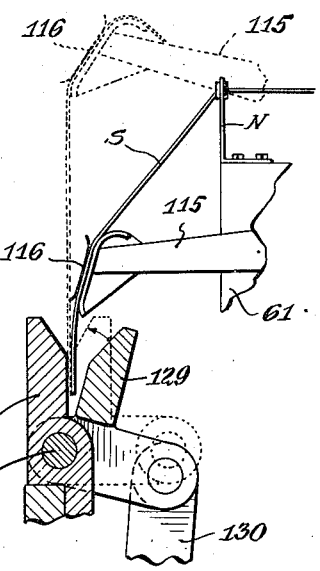
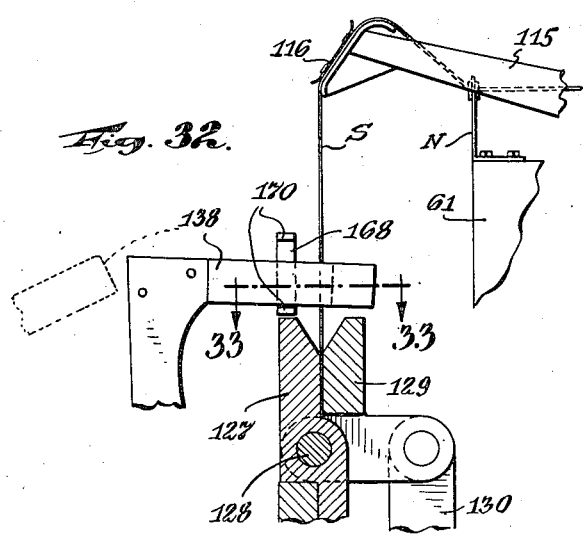
INVENTOR.
HENRY GANZ.
BY Angelo M. Pisarra
ATTORNEY.

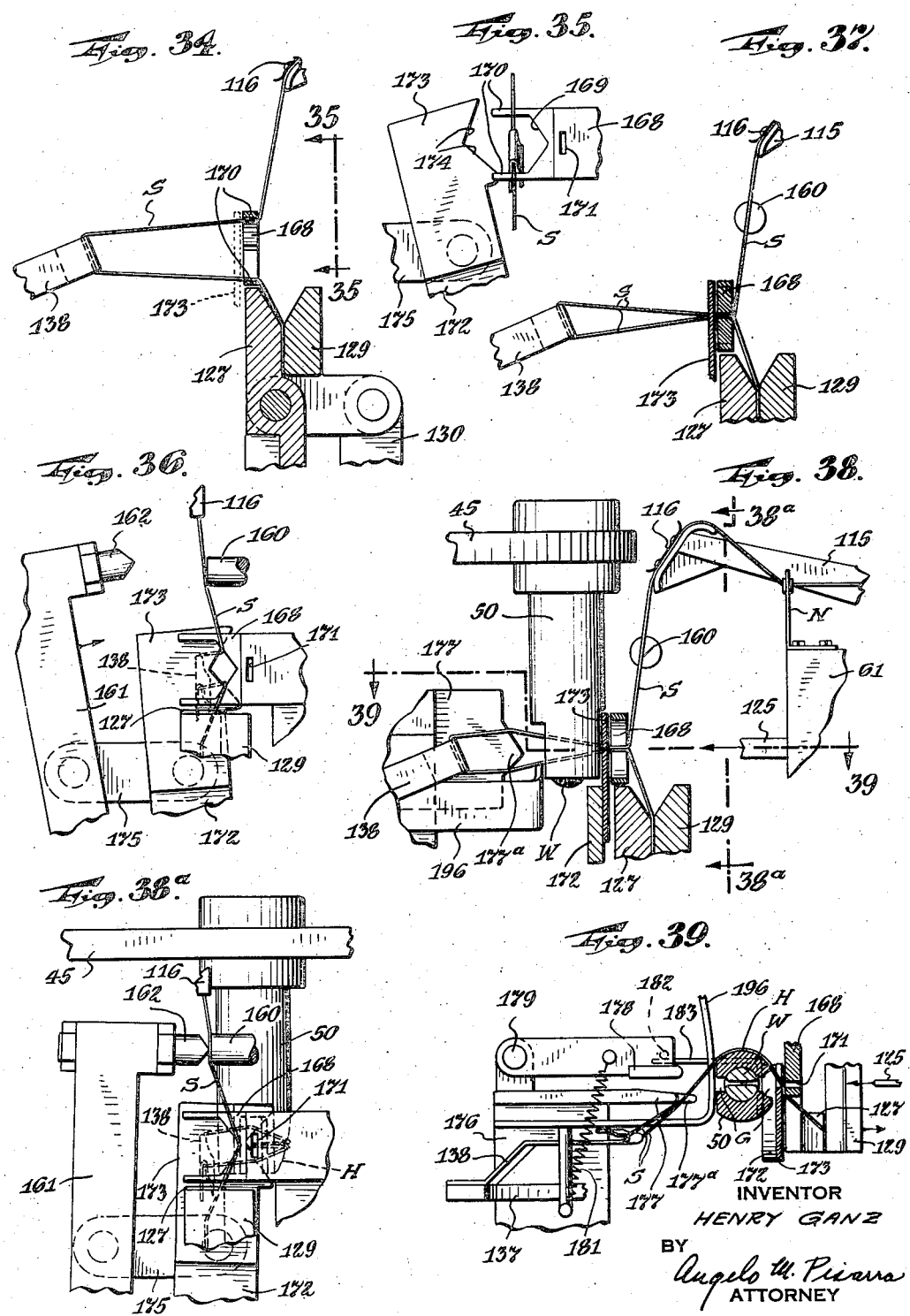

Feb. 22, 1949.    H. GANZ    2,462,178
TAMPON MACHINE AND METHOD FOR MAKING TAMPONS
Filed Jan. 13, 1944    14 Sheets-Sheet 12
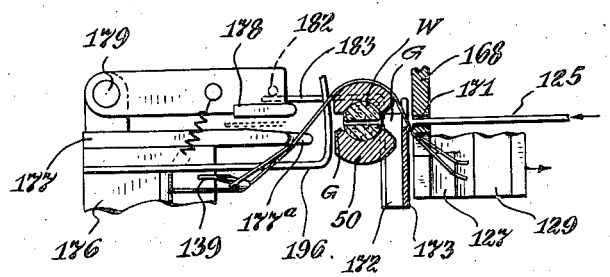
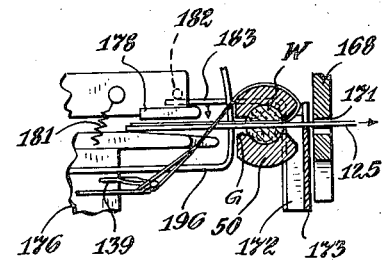
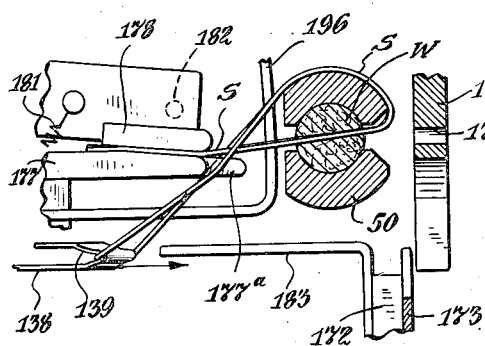
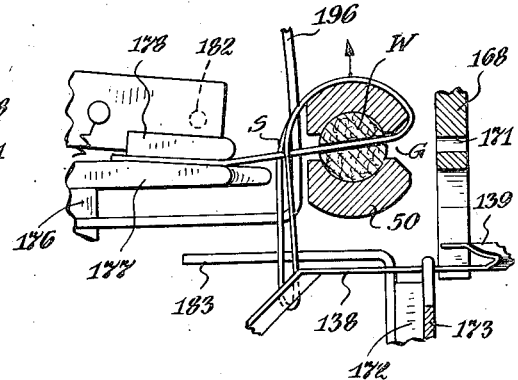
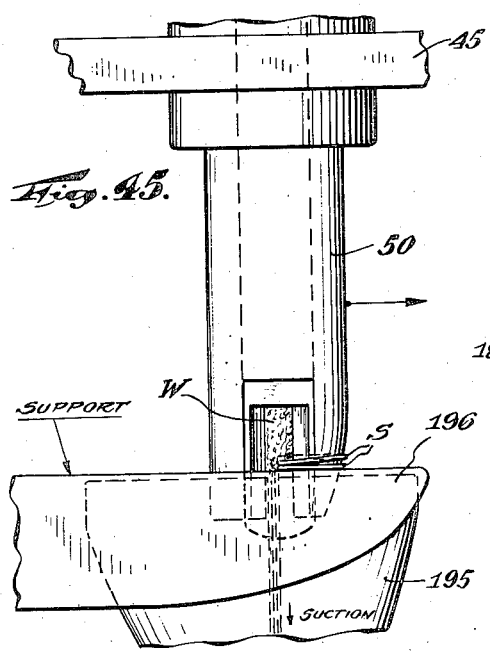
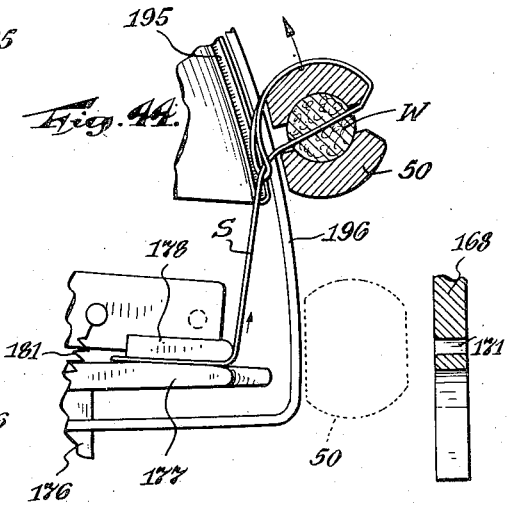
INVENTOR
HENRY GANZ
BY Angelo M. Pisarra
ATTORNEY Feb. 22, 1949.  H. GANZ  2,462,178
TAMPON MACHINE AND METHOD FOR MAKING TAMPONS
Filed Jan. 13, 1944  14 Sheets-Sheet 13

INVENTOR
HENRY GANZ
BY
Angelo M. Pisano
ATTORNEY

Feb. 22, 1949. H. GANZ 2,462,178
TAMPON MACHINE AND METHOD FOR MAKING TAMPONS
Filed Jan. 13, 1944 14 Sheets-Sheet 14
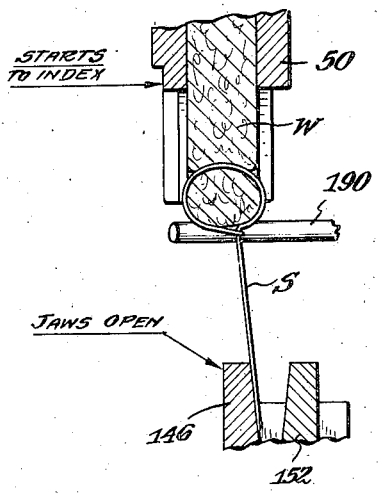
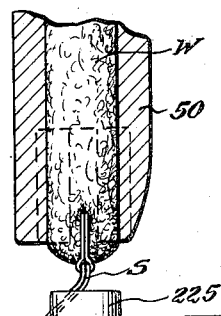
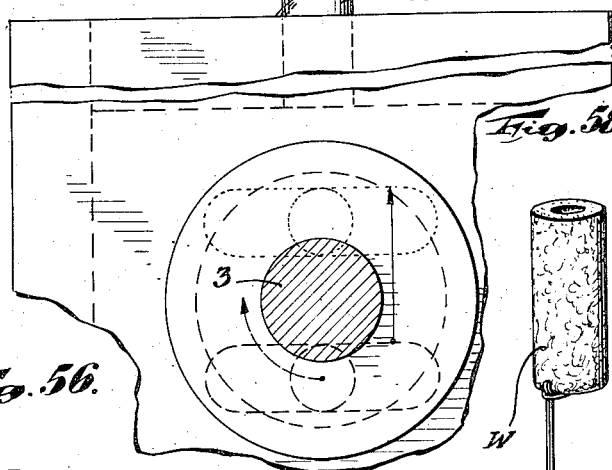
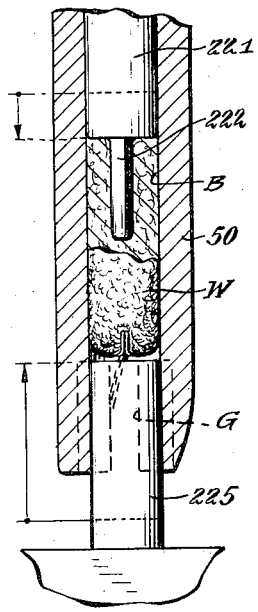
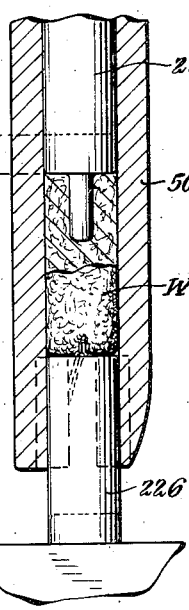
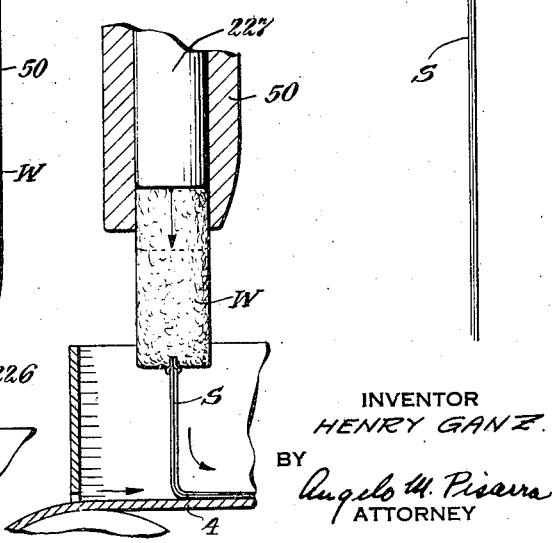
INVENTOR
HENRY GANZ.
BY
Angelo M. Pisarra
ATTORNEY Patented Feb. 22, 1949

2,462,178

UNITED STATES PATENT OFFICE 2,462,178

TAMPON MACHINE AND METHOD FOR MAKING TAMPONS

Henry Ganz, West Englewood, N. J., assignor to The Personal Products Corporation, a corporation of New Jersey Application January 13, 1944, Serial No. 518,160

26 Claims. (Cl. 18—5)

This invention relates to machines for forming fibrous material into compact masses of predetermined size and contour and to methods for making the same. In its more specific aspect, the invention is directed to novel apparatus for making tampons and to methods for making the same.

In certain of its broad aspects the invention briefly embodies a novel automatic machine for making tampons rapidly, at a low cost and with a minimum of manual labor. In its entirety the novel apparatus embodying the invention comprises a novel mechanism for feeding, a web of absorbent fibrous material, such as a carded cotton web, in a predetermined path and while in said path and if desired, folding said web and thereafter separating a predetermined length of said folded web from the remainder of the web. This predetermined length of folded web is then moved by a novel positioning mechanism operating in timed relationship with the feeding and separating mechanism to position the length of folded web over a novel die carried on a novel turret which may be indexed from position to position by a novel drive mechanism. Novel mechanism is coupled with the die carrying turret to couple a draw cord with the individual folded web length after insertion into the die. Also cooperating with the die carrying turret is a novel mechanism for inserting the individual folded web into the die and for compressing the same into a tampon of predetermined size and contour.

An object of this invention is to provide apparatus for continuously making tampons at a high rate of speed, at low cost and with a minimum of manual labor, if any.

Another object of this invention is to provide a novel apparatus for compressing fibrous material into compressed wads at a high rate of speed.

Another object of this invention is to provide a novel apparatus for coupling a draw cord with a tampon.

Another object of this invention is to provide a novel method for making tampons.

Another object of this invention is to provide a novel method for coupling a draw cord with a tampon.

Other objects will in part be obvious and will in part appear hereinafter.

An embodiment of an apparatus embodying the invention is shown in the drawings, wherein Figure 1 is a front view of a machine embodying the invention.

Figure 4 is a sectional view taken on line 4—4 of Figure 3 in the direction of the arrows.

Figure 4a is a fragmentary view showing a portion of Figure 4 and illustrating the manner of separating a portion of the folded cotton web from the remainder.

Figure 5 is a sectional view taken on line 5—5 of Figure 4.

Figure 6 is a sectional view taken on line 6—6 of Figure 4.

Figure 7 is a sectional view taken on line 7—7 of Figure 4.

Figure 8 is a sectional view taken on line 8—8 of Figure 4.

Figure 9 is a sectional view taken on line 9—9 of Figure 4.

Figure 10 is a sectional view taken on line 10—10 of Figure 4, but shows only the individual folded web length and the supporting table therefor.

Figure 11 is a sectional view taken on line 11—11 of Figure 3.

Figures 12, 13 and 14 are fragmentary views showing the relationship of the actuating parts with respect to each other in the different steps of moving the individual folded web into position for insertion.

Figure 15 is a diagrammatic view of the die carrying turret table showing the different index positions.

Figure 16 is a cross sectional view taken on line 16—16 of Figure 3.

Figure 17 is a top view of Figure 16.

Figure 18 is an enlarged sectional view showing the position of the pin with respect to the cotton and dye.

Figure 19 is a view taken on line 19—19 of Figure 18.

Figure 21 is a sectional view taken on line 21—21 of Figure 3.

Figure 22 is a sectional view taken on line 22—22 of Figure 21.

Figure 23 is a sectional view taken on line 23—23 of Figure 22.

Figure 25 is a perspective view of a predetermined length of a carded cotton web after folding and severing and just before pushing.

Figure 26 is a sectional view showing the configuration of the folded cotton after it has been pushed to position at the entrance of a die.

Figure 27 is a cross sectional view of the relative position of the die and plunger and tampon material after insertion of said material shown in Figures 25 and 26 into the die.

Figure 28 is a perspective view of the cotton or tampon material after insertion and withdrawal of the inserter from its position shown in Figure 27.

Figure 29 shows the relative position of the cylindrical formation of tampon material, die and piercing or separating pin after insertion of the pin at the piercing station.

Figure 30 is a perspective view of the preformed loosely compacted cylindrical formation of tampon material after piercing to provide an eye for draw string or cord threading therethrough.

Figure 31 shows the placing of one end of the string between a pair of jaws in the course of placing the string in predetermined position for threading it through the eye.

Figure 32 shows the relative position of the string placer and the jaws after the string has been drawn taut and shows the relative position of the looper before retraction.

Figure 33 is a sectional view taken on line 33—33 of Figure 32.

Figure 34 shows the position of the string looping device in its retracted position and holding the string and the position of the string loops with respect to a string leg guide.

Figure 35 is a view taken on line 35—35 of Figure 34 looking in the direction of the arrows.

Figure 36 is a view similar to Figure 35 with the legs of the string being partially drawn together by the V-shaped slotted elements.

Figure 37 is a sectional view showing the legs of the string after they have been brought close to each other at the V-shaped slotted elements.

Figure 38 is a view similar to Figure 37 and shows the die coming to the threading station.

Figure 38a is a cross sectional view taken on line 38a—38a of Figure 38.

Figure 39 is a cross sectional view taken on line 39—39 of Figure 38.

Figure 40 is a sectional view similar to Figure 39 and shows the string pushing needle 9 about to engage the free ends of the string.

Figure 41 is a view similar to Figure 40 and shows the pushing needle in its maximum inserted position with the free ends of the string having passed through the looped end thereof and being located between a pair of jaws.

Figure 42 is a view showing the free ends of the string clamped by the jaws after the string pushing needle has been completely retracted.

Figure 43 is a view similar to Figure 42 and shows the position of the loop former after disengaging the string.

Figure 44 is a view similar to Figure 43 and shows the manner of drawing towards each other the legs of the string by movement of the threaded tampon material carrying die which is traveling to the next position.

Figure 45 is a side view showing the relative position of the die, looped string and a suction guide for the free ends of the string in the course of travel of the die from threading to tying position.

Figure 53 is a view similar to Figure 52 and shows the next step of releasing the free ends of the string after tightening.

Figure 54 is a view showing the die at the initial compressing position.

Figure 55 is a view showing the step of initial compression.

Figure 56 is a view similar to Figure 55 and shows the step of final compression.

Figure 57 is a view similar to Figure 56 and shows the ejection step of the finished tampon.

Figure 1:
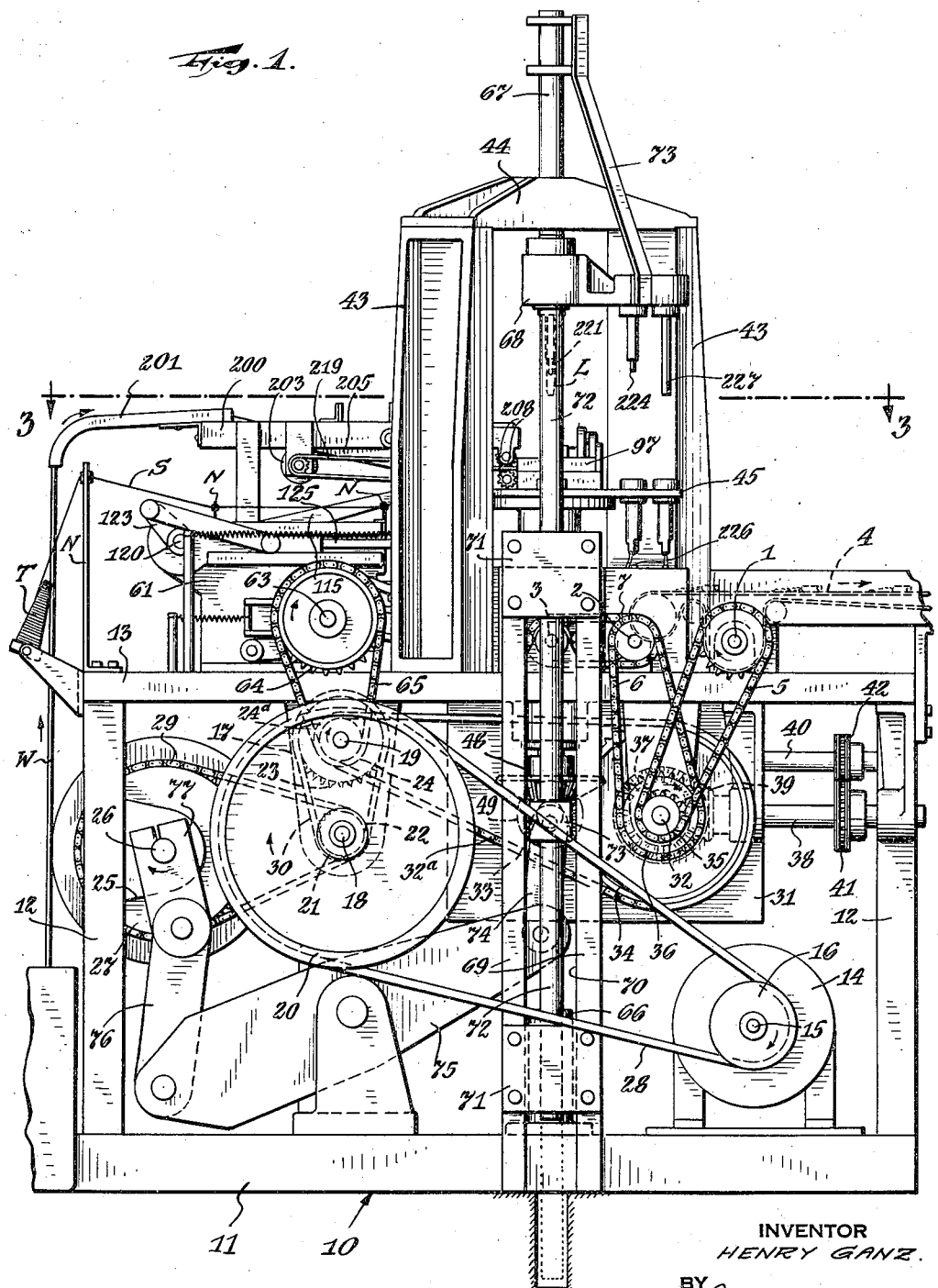

One of the embodiments of the invention as shown in the drawings comprises a supporting frame 10 having a base 11 to which are rigidly secured a plurality of corner uprights 12. A top support 13 is rigidly secured to the uprights 12. Located below said top 13 and mounted on said base 11 is a driving mechanism which may be an electric motor 14 having a drive shaft 15 to which is keyed a drive wheel 16. Secured to the top 13 and depending from the under face thereof are a pair of journal supporting brackets 17. A pair of horizontally disposed spaced parallel shafts 18 and 19 are mounted in journals (not shown) in said brackets 17 for rotation therein. Keyed to the lower shaft 18 and spaced from each other are a pair of pulley wheels 20 and 21 and a sprocket wheel 22. Keyed to the upper shaft 19 and spaced from each other are sprocket wheels 23, 24 and 24a. Journal supporting brackets 25 are located below the top 13, are secured to one of the uprights 12 and extends inwardly therefrom. A shaft 26 is carried by the journals (not shown) in brackets 25 for rotation therein and has a pulley wheel 27 keyed thereto. A continuous belt 28 extends around the pulley wheels 16 and 20 for driving shaft 18 by motor drive 14 and a continuous belt 29 extends around pulley wheels 21 and 27 to drive the shaft 26. A continuous chain 30 extends around the sprockets 22 and 23 to drive the shaft 19.

Secured to the top 13 and depending downwardly therefrom is a Geneva mechanism located in housing 31 and having an input shaft 32 and an output shaft 33. Keyed to said input shaft 32 are sprocket wheels 34, 35 and 36 and a bevel gear 37. The input shaft 32 is driven by a chain 32a extending around the sprocket wheel 24a and sprocket wheel 34. Mounted on a journal in one of said uprights 12 and a journal on said housing 31 is a shaft 38 having a bevel gear 39 keyed thereto and meshing with the bevel gear 37 which drives the shaft 38 through gear 39. Also mounted in a journal on an upright 12 is a main cam shaft 40. Sprocket wheels 41 and 42 are respectively keyed to shafts 38 and 40 and have a continuous chain therearound for driving shaft 40 through shaft 38.

Figure 24:
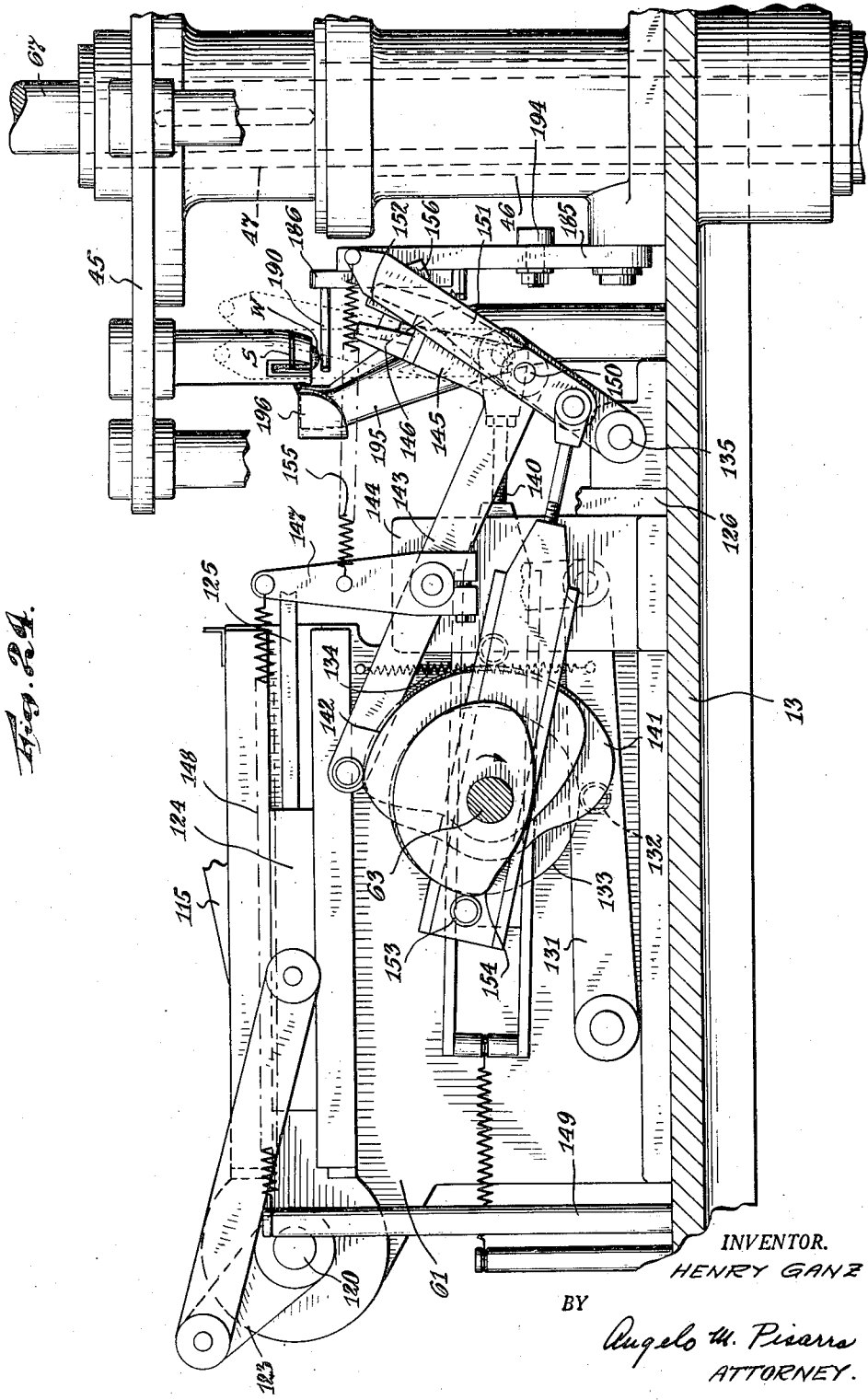
Figure 24 is a sectional view taken on line 24—24 of Figure 3.

Mounted on said frame 10 and extending upwardly from its top 13 is a plunger head guiding frame having sides 43 and top 44. Also mounted on said top 13 and within the limits of the sides 42 is a rotatable disc turret top or table 45 having a central bearing 46 (Figure 24) integral therewith. Extending through the bearing 46 and secured to the turret table 45 is a hollow shaft 47 having a beveled gear 48 secured thereto at its lower end. Meshing with the bevel gear 48 is a bevel gear 49 connected to the output or intermittent drive shaft 33 of the Geneva mechanism, which drives and indexes the table 45 from station to station to intermittently move each die carried thereby in a recurring series of different positions shown in Figure 15. Circumferentially spaced on the outer marginal periphery of turret top 44 are a plurality of equally spaced openings and as shown, eight openings through which extend dies 50, 51, 52, 53, 54, 55, 56 and 57, all of which are exactly alike.

As shown in Figures 26, 27, 29 and 45, each of said dies may consist of a cylinder A having a bore B whose diameter is that of the finished tampon to be manufactured. The upper end of said cylinder A has a supporting head C with a supporting shoulder D. The outside portion of the cylinder A is threaded below the shoulder D at E. The head C at the upper end of cylinder A has an upwardly outwardly tapered opening F communicating with said bore and acts to facilitate the entry of material for the tampon formation. The lower end of the cylinder A has a central vertical slot G therein. The outer surface of the lower part of said cylinder A on one side of said slot G is tapered inwardly downwardly at H. Each of said dies is mounted on the turret 45, with the cylinder A thereof located below the lower face of turret 45 and with the shoulder D resting on the upper face of turret 45. All of said dies are disposed vertically and are so positioned that the slots G are on the radii of the turret 45 and the tapered portions H are all leading faces. A collar 58 makes a threaded connection with the threaded portion E of each die and cooperates with the shoulder D to demountably secure the dies to the turret 45 and maintain them in fixed position.

Supported in bearings 60, 61 and 62 above the supporting top 13 is a main cam shaft 63 having a sprocket wheel 64 secured thereto near one end thereof and driven by a chain 65 extending therearound and around the sprocket 24 on shaft 19. Extending through the head 44 and through the turret top 45 and also through the bearing 46 and a lower bearing 66 on base 12 is a vertically reciprocating shaft 67 having keyed thereto a plunger carrying head 68. A guide 69 having a vertical guideway 70 is secured to one side of frame 10. Said guide 69 has a pair of spaced bearings 71 secured thereto and accommodating a vertically reciprocating shaft 72 whose upper end is secured to the head 68. Mounted in the guideway 70 and secured to shaft 72 is a slide block 73. Shafts 67 and 72 are connected together at their upper ends through a bracket element 73. Both shafts 67 and 72 are connected to the upper ends of a pair of pivoted links 74 whose lower ends are pivotally connected to one end of a centrally pivoted counterweight actuator 75. The other end of actuator 75 is pivotally connected to one end of a connecting link 76 whose other end is pivotally connected to a crank lever 77 secured or keyed to shaft 26 for imparting vertically reciprocating movement to the plunger carrying head 68.

Mounted on the top 13 as shown in Figures 16 to 18 is a supporting table 80 having a longitudinal guide slot 81 therein. The forward end of the table has a recess 82 through which may pass the dies in the course of movement of the turret top 45. The recess defines a forward abutting support 83 having a longitudinal opening therethrough. A piercing or spreading pin 84 is carried by a reciprocating head 85 located in the slot 81. Extending upwardly from the head 65 and secured thereto is a connecting pin 86 pivotally connected to one end of a link 87 whose other end is pivotally connected to one end of a crank lever 68. The other end of the crank lever 88 is keyed to a shaft 89 having a bevel gear 90 keyed thereto. The main drive shaft 63 has keyed thereto a bevel gear 91 which meshes with the bevel gear 90 to drive the shaft 89 which in turn actuates the crank lever and continuously reciprocates the head 85 and pin 84 as shown.

Pivotally mounted on bracket 61 is a string placer lever 115 having a friction clamp 116 at the free end thereof. Intermediate its ends and pivoted to lever 115 is a cam follower 117 actuated by a cam 118 keyed to the continuously driven cam shaft 53. A spring 119 has one end thereof secured to the lever 115 and its other end secured to the bracket 61 in order to maintain the cam follower 117 in contact with the cam 118 throughout rotation of the cam 117. Also carried by the continuously driven shaft 53 and driven thereby is a sprocket wheel 119 which drives a shaft 120 through sprocket wheel 121 having a chain 122 therearound and around sprockets 119. Keyed to the shaft 120 is a crank mechanism 123 having one end secured to the shaft 120 and its other end secured to horizontally reciprocating head 124 carrying a string inserting needle 125. By this construction the shaft 63 simultaneously moves the needle 125 to and fro and swings the free end of lever 115 up and down.

Secured to the table top 13 and extending upwardly therefrom is a supporting bracket 126 having the stationary jaw 127 of a clamp secured thereto. Hinged at 128 to the lower end of the jaw 127 is a pivoted jaw 129 connected to link 130 which in turn is connected to link 131 pivoted to the bracket 61.

Intermediate the ends of the link 131 is a cam follower 132 maintained against a cam 133 keyed to continuously driven shaft 63 by a tension spring 134 connected to the link 131 and to the bracket 61 so that the movable jaw 129 is actuated in response to the movement of the link 131 as it is moved by the cam 133. Also hinged to the bracket 126 at 135 is an arm 137 carrying a loop former 138 which essentially consists of a relatively thin plate whose outer end is in the form of a hook 139. The loop former 138 is actuated by a pivoted element 140 actuated by a cam 141 keyed to drive shaft 63. Also driven by the shaft 53 is a cam 142 for driving a pivoted lever 143 pivoted on bearing 144 and having integral therewith and extending therefrom a short arm 145 terminating in a jaw 146. Fixedly mounted on the lever 144 and extending upwardly therefrom is an arm 147 having a tension spring 148 connected thereto and to an anchor rod 149 with the spring 148 tending to move the arm 147 and the lever 144 in a counterclockwise direction.

Pivoted to the end of the lever 144 at pivot 150 is a lever 151. The lever 151 is keyed to the pivot shaft 150 which also has keyed thereto a movable jaw 152 adapted to cooperate with the jaw 146. The lever 151 is actuated by a cam follower 153 which in turn is actuated by a cam 154 driven by the continuously rotating shaft 63. A tension spring 155 has one end connected to the free end of the lever 151 and its other end connected to the arm 147 and by tending to swing the lever 151 in a counterclockwise direction maintains the cam follower 153 continuously against the cam 154. Attached to the lever 151 near the end thereof is a wiper or brush 156.

Also mounted on bracket 126 and above the jaws 127 and 129 is a platen 160. Also mounted on bracket 126 and pivoted thereto is a lever 161 carrying a string cutter or knife 162 also located above the jaws 127 and 129. A pivoted lever 163 having a cam follower 164 at one end is supported by the top 13 and is actuated by a cam 165 driven by continuously driven shaft 40. The other end of lever 163 is pivotally connected to the lower end of lever 161 through an adjustable link 166 so that the cutter 162 may be swung towards and away from platen 160 in response to rotation of cam 165.

Located between the level of the cutter and platen 162 and 160 respectively and the jaws 127 and 129 is a stationary plate 168 having a slot therein which is of V-shape at 169 and terminating in parallel sides 170. The plate 168 has an elongated narrow oblong opening 171 therethrough just behind the apex of the V slot 169. Also pivoted to the bracket 126 is a lever 172 having its free end in the form of a plate 173 having a V-shaped cutout or slot 174 therein. A link 175 connects the lever 172 to the lever 161 so that the plate 173 and the knife 162 move in unison.

These plates are so arranged opposite and close to each other so that the larger ends of the slots 169 and 174 face each other. Alongside the bracket 126 and secured to the table top 13 is a bracket 176 having integral therewith at its upper end a stationary jaw 177 located to one side of the elements 168 and 173.

A movable jaw 178 is pivoted at 179 to the bracket 126 and is normally actuated by a tension spring 181 connected thereto and to the stationary jaw 177 and tends to maintain these jaws 177 and 178 in closed position. The movable jaw 178 has a pin 182 depending therefrom and adapted to be actuated by a striking element 183 secured to the lever 172 and adapted upon movement of the lever 172 to strike against the pin 183 to swing the movable jaw 178 against the action of the spring 181 and away from jaw 177.

Secured to the bearing 46 is a pivot 184 having a lever 185 pivoted thereon. Near the end of lever 185 is a short lever 186 pivoted at 187 and located between a pair of stops 188 and 189 and carrying a transverse tie tightening pin 190. The pin 190 is normally maintained in the inoperative position shown in Figure 22 by a tension spring 191 secured thereto and to the lever 185. The lever 185 is actuated by a cam follower lever 192 actuated by a cam 193 driven by the cam shaft 40 and through a connecting link 194.

Between the threading and tying station III and the tie tightening station IV is located a suction trough 195 for retaining the free ends of the draw string in the course of travel and tie tightening. Secured to the bearing 176 and extending to one side of jaws 177 and 178 and then arcuately in front of said jaws and to the rear of suction trough 195 is a retaining guide 196 for maintaining in position on the die the partially tightened slip knot in the course of movement from station III to IV.

Supported on the table 13 are three bearings for supporting three shafts 1, 2 and 3, each having keyed thereto sprocket wheels. An endless belt 4 is mounted on the top 13 and has one end thereof located below the turret table 45. This belt is driven by the drive shaft 1 which in turn is driven by sprocket 35 through chain 5. Shaft 2 is driven also by drive sprocket 36 through chain 6 and shaft 3 is driven by shaft 2 through chain 7. As the shaft 1 is driven, the upper reach of the endless belt 4 has deposited thereon completed tampons and this reach travels away from the turret table 45 to move the tampons to the packing station.

A bracket 92 is secured to one of the uprights 12 and extends outwardly therefrom. Bracket 92 has a journal in which is mounted the continuously driven cam shaft 40. Keyed to said main shaft 40 at a position adjacent said bracket are cams 93 and 94. A standard 96 rests on the top 13 and is secured thereto near bracket 92. Supported on standard 96 is a guide table 97 having a horizontal smooth slide 98 and a thrust element 99.

Pivoted at one end of the guide table 97 is one end of an inverted shallow V-shaped camming element or track 100 whose other end is pivoted to one end of a lengthwise adjustable vertical rod 101 whose other end is secured to the upper end of an elongated oblong shaped yoke 102 having its lower end closed by a cross bar 103. Cross bar 103 is connected to one end of a tension spring 104 whose other end is anchored to a bar 105 secured to the frame 10. The upper end of the yoke 102 has a circular roller follower 106 which is automatically maintained in contact with the camming surface of the cam 93 by the force automatically applied thereto through the tension spring 104. Pivoted on said bracket 92 is a lever 107 whose lower end has a circular roller cam follower 108 and whose upper end is pivoted to a pusher 109 having a pusher cross bar 110. The pusher 109 carries a roller 111 riding along the upper face of track 100. A tension spring 112 is connected to the pusher 109 and to the lever 107 to maintain roller 111 on track 100. A tension spring 113 is connected to the lever 107 and to standard 96 for maintaining the roller 108 against cam 94.

Figure 2:
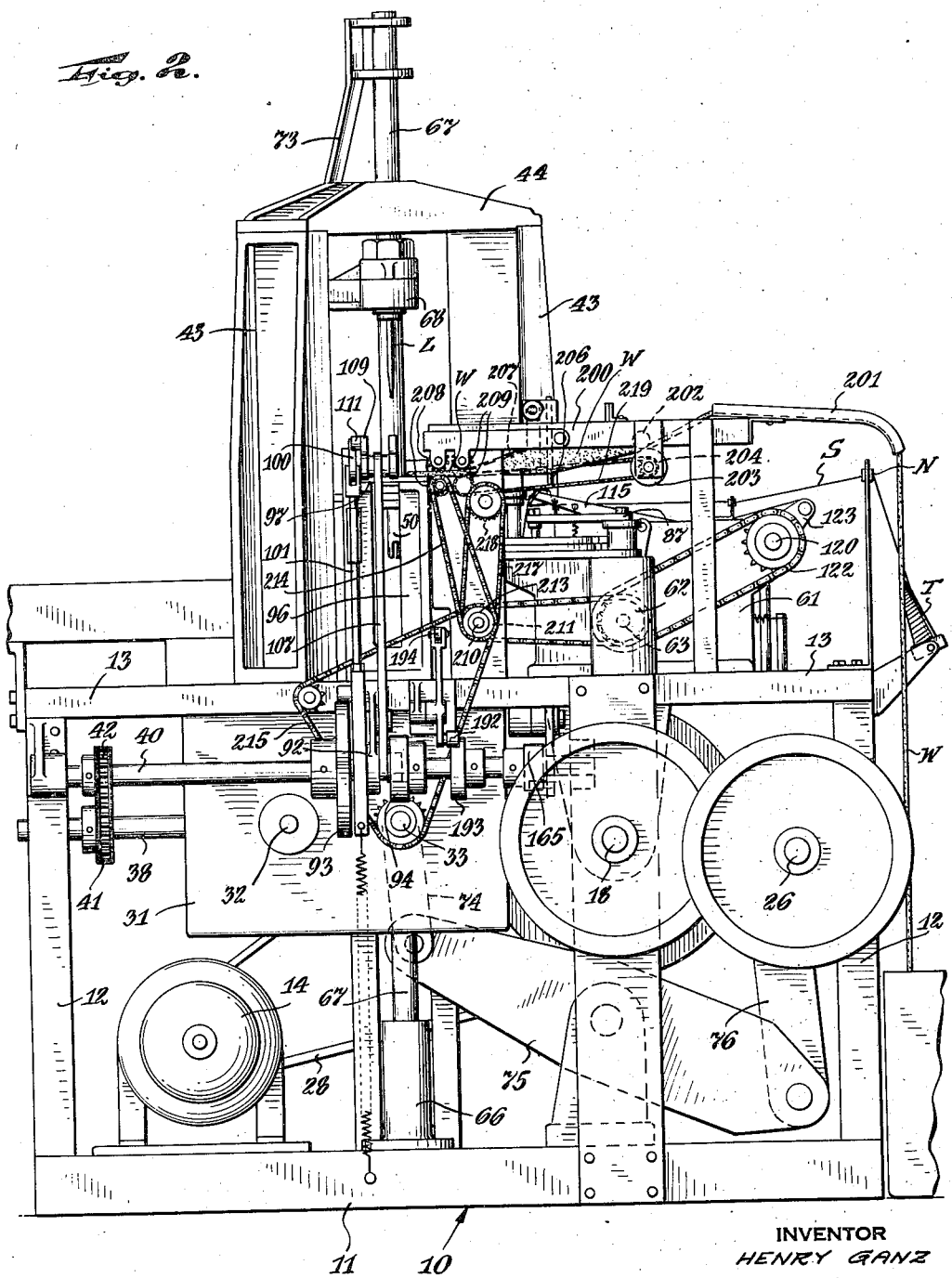
Figure 2 is a rear view of the machine shown in Figure 1.
Figure 3:
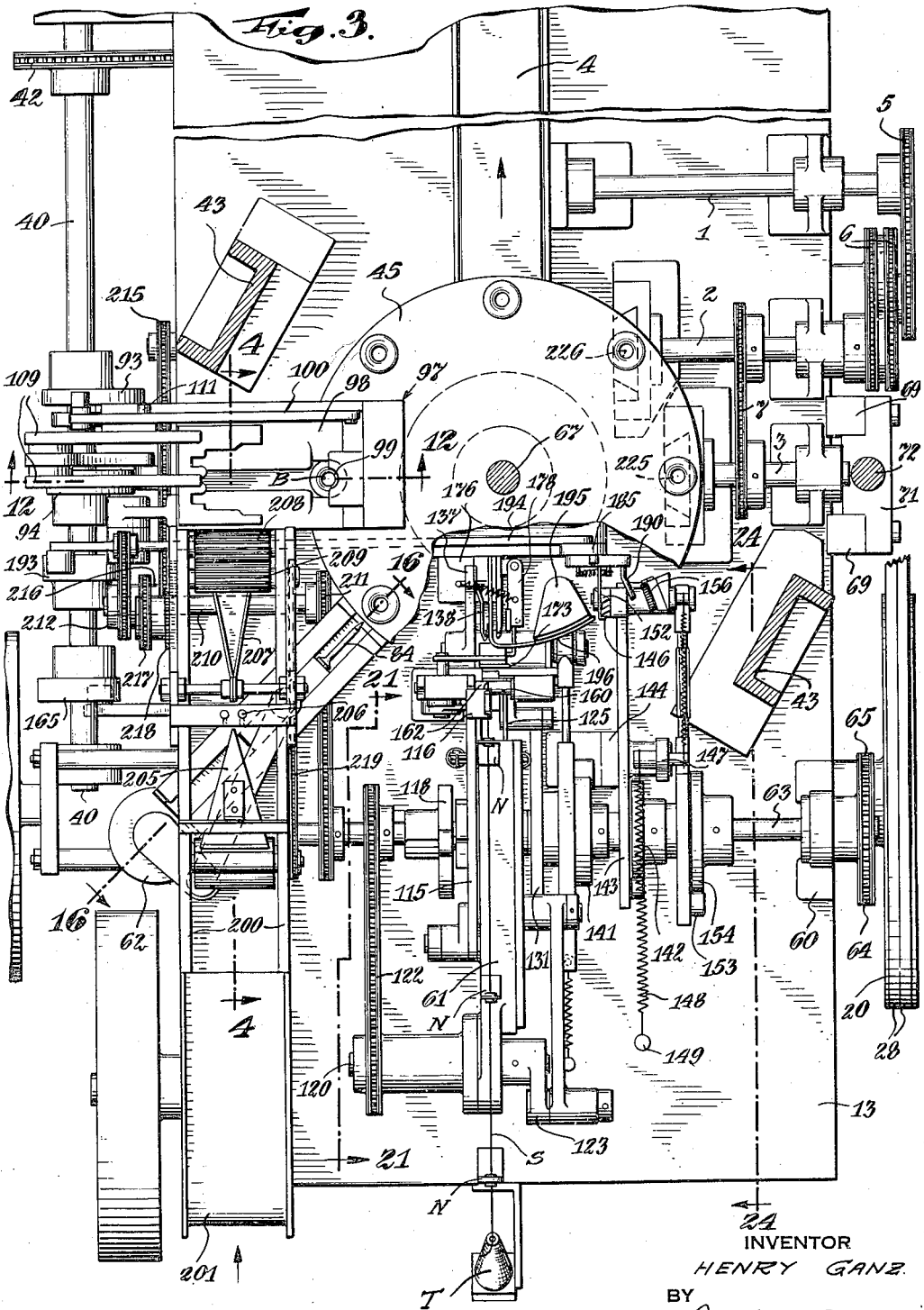
Figure 3 is a sectional view taken on lines 3—3 of Figure 1 in the direction of the arrows, and has a part of the turret table broken away to show the threading mechanism.

Mounted above the top 13 and disposed at about right angles to the guide 97 is a frame 200 having a supporting incline 201 secured thereto at the rear end thereof. Forward of the incline 201 and below the upper limit thereof are mounted a pair of rollers 202 and 203, the former being a follower pressure roller and the other being a driven roller and having a sprocket wheel 204 secured to the shaft thereof. Disposed along the length of the frame 200 between the sides thereof and at the discharge side of the feed rollers 202 and 203 is a downwardly slanting triangular element 205 whose base is located close to the feed rollers 202 and 203 and whose apex is spaced therefrom. Disposed slightly ahead of the apex of triangle 205 are a pair of vertical cylindrical rods 206 spaced a short distance from each other. Ahead of the rods 206 is a triangular folder 207 consisting of a pair of elements terminating in upstanding fingers at their front and diverging from each other at their rear shown in Figure 3. Forward of the folder are two pairs of rollers 208 and 209. Rollers 208 are in foremost position and are continuously driven by the shaft 63 which drives shaft 210 having sprocket wheel 211 keyed thereto. Also keyed to shaft 210 as shown in Figures 2 and 3 is another sprocket wheel 213 which in turn continuously drives the rollers 208 by a chain drive 214. Rollers 209 are intermittently driven by the output shaft 33 of the Geneva drive by chain drive 215 through a double sprocket wheel 216 loosely rotating on shaft 210 and driving through chain 217 and gear reduction drive 218 to roller 209. Roller 203 is intermittently driven by a chain drive 219 through sprocket 204.

A continuous web or band of an absorbent, fibrous material such as carded cotton may be fed directly from a cotton carding machine to the incline 201 and is fed intermittently by rollers 202 and 203, and also rollers 209. Between these sets of rollers 202 and 203 and 209 the web is maintained in tension and as it is drawn along the bottom face of triangle 205, it is folded in along its central longitudinal axis and so fold feeds between rods 206 and along the bottom face and side faces of the spreaders folders 207 and between the rollers 209 in a folded condition as shown in Figure 10. In such condition the folded web passes between continuously moving rollers 208 which feed a predetermined length of said folded web while rollers 209 are in motion and when rollers 209 come at rest the rollers 208 due to their continuous rotation separates from the remainder of the web as shown in Figure 4a a predetermined length of folded cotton web, which individual unit of web length is hereinafter designated by W and is shown in Figure 25.

As unit W leaves rollers 209 it slides onto table 98 as shown in Figures 11, 12, 13 and 15 which show the unit W being moved over to the entrance of die 50 on the indexing table 45. Figure 11 shows the position of pushing device 109 before it descends and engages the unit W as shown in Figure 12. As the cam shaft 40 continuously rotates in the direction of the arrow shown in Figure 11, cam 93 is continuously rotated to reciprocate rod 101 and pivotally swing the inverted V track 100 up and down. Simultaneously moving with the cam 93 is cam 94 which moves the pusher 109 back and forth along the track 100. Referring particularly to Figure 12, the cam 93 has moved to such a position that the rod 101 is brought down by the action of spring 104 and carried the inverted V track 100 to its maximum lower position where one leg of the track 100 is substantially parallel to the table 98. When the track 100 is in this position, a crossrod 110 on pusher 109 is riding on table 98 and pushes against the folded web length W. The cross bar 110 travels along the face of the table 98 to push the folded web W over a die 50 which is now in tampon material inserting position. The web length W is slightly compressed along its longitudinal axis against an abutment 99 as shown in Figures 13 and 26. As this web length W is kept in this position for a short period, an inserting plunger L tucks or inserts the web length W into said die 50 as shown in Figures 14 and 27 to provide a loosely compacted, elongated cylinder of generally U-shape, with the folded marginal portions being within the outer periphery of the cylinder as shown in Figure 28. The inserting plunger L has a smaller outer diameter than the bore B of die 50 and is tapered on each side along its effective length. The plunger L is so positioned that when inserted in die 50, its narrow edges are opposite the slots G as shown in Figure 27. Upon tucking or insertion of the folded web length W by the inserting plunger L, into die 50, the lower limit of W is located slightly below the lower extremity of die 50. Due to the tapered length of the plunger L the same may be readily removed after it has reached its lowermost position. In the course of plunger insertion and withdrawal in the formation of the cylinder shown in Figure 28, the inverted V track 100 is swung to its uppermost position and the arm 109 rides away from the die 50 and table 98 and in an elevated position above the table 98 to clear the next length of folded web W to be acted upon therewith for positioning at the next die 57 which will be located in the same position as the preceding die 50 upon indexing of the table 45. The table 45 is indexed by the output shaft 33 of the Geneva movement to index the table 45° thus providing a recurring series of different positions of each die as diagrammatically illustrated in Figure 15. Each die is moved from position "O" in which the die is empty to position I where as before described a unit W of absorbent, fibrous material is inserted in the die 50.

With the die 57 now in position I and die 50 in piercing or separating position, also known as position II, as shown in Figures 16, 17, 18 and 19 the continuously driven reciprocating pierce or separating pin or knife 84 passes above the bottom of the die 50, through a slot G, thence through the cylinder W at a position slightly above the loop of the legs thereof and between the inner faces of the legs of the cylinder, through the other slot G and finally through a guide opening 83. After insertion, the piercing or separating needle 84 is retracted. As this action was taking place with respect to die 50, the die 57 was acted upon at position I in the same manner as was die 50 when at position I.

The table 45 is again indexed by the output shaft 33 of the Geneva movement to rotate the table another 45° and locate die 50 at position III or threading and tying position, die 57 at position II and die 56 at position I.

Just before table 45 rotates to index die 50 from position II to III, a predetermined length of cord or string S is drawn from a spool T shown in Figures 1 and 2 and passes through a number of string guides N into the friction spring clamp 116 at the free end of the string placer lever 115 actuated by contionuously driven cam shaft 63 through a cam 118 and follower 117. A short loose end of the cord S hangs from clamp 116 and the lever 115 is moved to its maximum downward position as shown in Figure 31 to place said loose end between the jaws 127 and 129 now open. As the lever 115 reaches its lowermost position, the jaw 129 is actuated by cam 133 on shaft 63 to close said jaws 129 and 127 upon the cord end after when the string placing lever 115 swings upwardly to its maximum upper position shown in Figure 32 thereby positioning and maintaining taut a length of cord between jaws 127 and 129 and clamp 116. In the course of positioning said length of cord, the loop former 128 is actuated by cam 141 on shaft 63 to pass through the slot in stationary element 168 and move the hook end thereof beyond the taut cord and then retract the same to engage said cord and pull two widely spaced legs thereof within the horizontal legs 170 of the stationary element as shown in Figure 34. The movable V jaw member 173 cooperates the stationary member 168 to engage and draw together legs of the cord as indicated successively in Figures 35, 36 and 37. Just about this time the table has indexed the die 50 to position III as shown in Figures 38, 38a and 39. In the course of indexing die 50 from position II to III, the leading or tapered lower front face H of die 50 strikes against the two legs of the draw cord, to draw out more cord from the spool and through the friction clamp 116. The two horizontal legs of the draw cord with a loop at the loop former 138 are slided over a stationary spreader 177a integral with jaw 177 to increase the distance between the string legs at that place as shown in Figure 38a. When the movable element 173 reaches the innermost position, the bar 183 actuates the pin 182 to move jaw 178 against the action of spring 181 and away from jaw 177. At the same time that the element 173 reaches its innermost position, the cord cut-off knife 162 connected thereto by link 161 also reaches its innermost position to cut off the upper end of the string S against platen 160. As the cut-off knife 162 reaches its innermost position, the movable jaw 129 swings away from jaw 127 releasing the lower end of the cord. Immediately after cut off and release of the ends of the draw cord, continuously reciprocating needle 125 also driven by cam shaft 63 passes through the opening 171 in stationary plate 168 registering with the slots G in die 50. The needle 125 passes through the slot 171 and engages the two ends of the cord which are close together and pushes them through slot G, the opening in the cylinder W, slot G again and then through that open portion of the loop and between the jaws 177 and 178 as shown in Figures 40 and 41. As the needle 125 and the free ends of the cord carried thereby reach their innermost position, the movable plate 173 begins to retract and spring 181 automatically operates to close the jaws 177 and 178 against the free ends of the cord while the threading needle is also retracting. Figure 42 shows the free ends of the cord held between the jaws 177 and 178 after the needle 125 has been completely retracted. After the jaws 177 and 178 have clamped the free ends of draw cord, the hook 139 moves forward as indicated by the arrow in Figure 42 and becomes disengaged from the loop end of the cord as shown in Figure 43. As this action was taking place with respect to die 50 at position III, die 57 was acted in position II in the same manner as was die 50 when in that position and die 56 was acted upon in position I in the same manner as were dies 50 and 57 when in position I.

Figure 46:
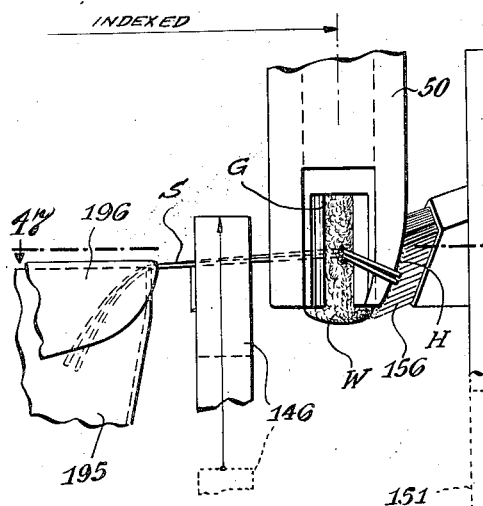
Figure 46 is a view similar to Figure 45 and shows the position of the wiper brush and string holding jaws just before engagement of the string thereby.
Figure 47:
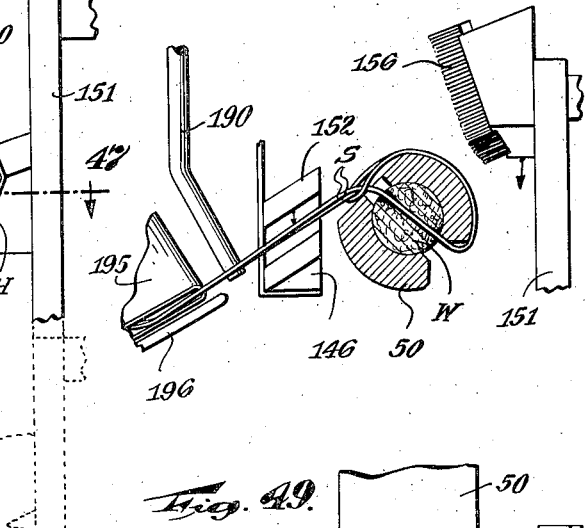
Figure 47 is a view taken on line 47—47 of Figure 46.
Figure 48:
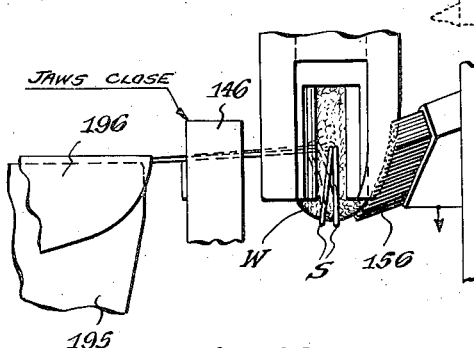
Figure 48 is a view similar to Figure 46 and shows the position of the string after being wiped down by the wiper brush.
Figure 49:
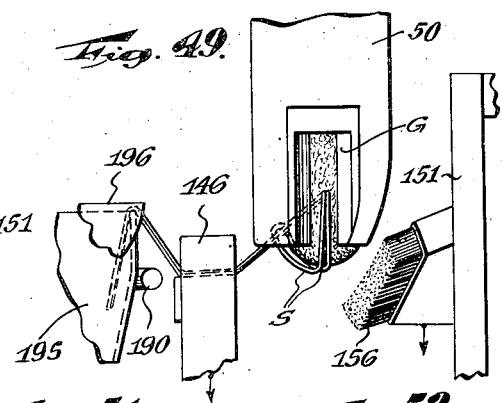
Figure 49 is a view similar to Figure 48 and shows the string engaging jaws moving downwardly to pull the free ends of the string and bring the slip loop in the position shown in Figure 50.
Figure 50:
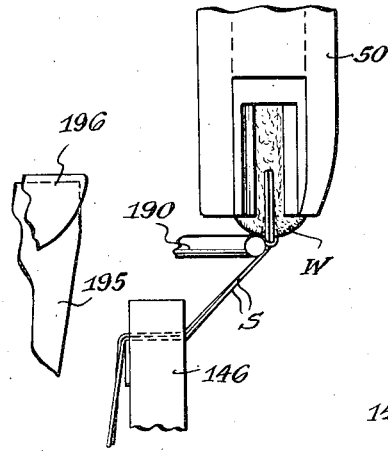
Figures 50 and 51 are views showing the next consecutive steps of centering and tightening the string on the tampon material.
Figure 51:
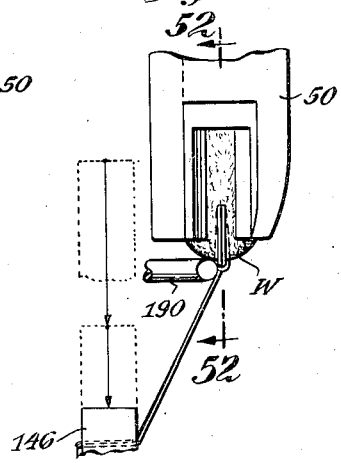
Figure 52:
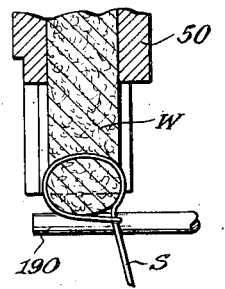
Figure 52 is a sectional view taken on line 52—52 of Figure 51.

The table now is moved another 45° to index the die 50 from position III to IV, die 57 from position II to III, die 56 from position I to II and die 55 to position I. In the course of moving from position III to IV, the slip loop is somewhat tightened and the free ends of the cord A are drawn out of the closed spring pressed jaws 177 and 178 and are immediately drawn into a suction trough 195 to keep the loop tight against the die 50 as shown in Figures 44 and 45. Also aiding in maintaining the loop in position is loop supporting bar 196. As the die 50 reaches the indexed position IV, the free ends of the draw cord S are still held in the suction trough 195, the jaws 146 and 152 and the wiping brush 156 are simultaneously actuated by shaft 63 to move them from the dotted line positions to the full line positions shown in Figures 46 and 47 to grip the loose ends of the cord and to wipe down along the outer smooth face H of the die, the looped end of the cord into position with loop being center at the bottom of the cylindrical formation was shown in Figure 48. The jaws 146 and 152 now close upon the free ends of the cord and are moved downwardly by shaft 63 as indicated in Figure 49 partially to tie the loop. After the jaws 146 and 152 have moved part way in the tying operation, pin 190 actuated by shaft 40 engages the lower part of cylinder W at its midsection to locate the tying thereat on further drawing down of the jaws as shown in Figures 50 to 52. Upon reaching their lower limit, jaws 146 and 152 open to release the free ends of the cord. As this action was taking place with respect to die 50 at position IV, die 57 was acted upon at position III in the same manner as was die 50 when at position III and die 56 was acted upon at position II in the same manner as were dies 50 and 57 when at position II and die 55 was acted upon at position I in the same manner as were dies 50, 57 and 56 when at position I.

Platen or supporting plungers 225 and 226 are respectively located at positions V and VI and are automatically moved up and down in operative and inoperative positions by the continuously driven shafts 2 and 3. As shown in Figure 54, the plunger 225 is actuated by a sliding block supporting said plunger and having a follower slot in which is located an eccentric pin extending into said slot and connected to shaft 3. As shown in said figure as shaft 3 is rotated in a clockwise direction, the eccentric pin is revolved in the same direction and moves in said slot and moves the block upwardly, the pin and slot assuming the dotted position and the slot and block moving in the direction shown by the vertical arrow.

The index table 45 is again indexed 45° to move die 50 from position IV to V, die 57 from position III to IV, die 56 from position II to III, die 55 from position I to II and die 54 to position I. Upon reaching position V the platen plunger 225 is raised upwardly as shown in Figure 55 to push the cylindrical formation W to such upward position that the lower limit of formation W is above the upper limit of the die slots G and its upper limit is below the upper limit of the bore B of the die. When the element W reaches its maximum upper position in die 50, a compression plunger 221 having a smaller or pilot end 222 is moved into the bore B of die 50 to compress the cylinder W and to form a central elongated cylindrical recess therein at the end thereof away from the end to which the draw string is tied. Then the plunger 221 and 225 are retracted from the die 50 and the table 45 is now just about ready to index to its next position and the partially compressed element W is self-retained in the bore B. As this action was taking place with respect to die 50 at position V, die 57 was acted upon at position IV in the same manner as was die 50 when at that position, die 56 was acted upon at III in the same manner as were dies 50 and 57 when at that position, die 55 was acted upon at position II in the same manner as were dies 50, 57 and 56 when at that position and die 54 was acted upon at position I in the same manner as were dies 50, 57, 56 and 55 when at the position.

The table 45 again automatically indexes 45° to move the die 50 from position V to VI, die 57 from position IV to V, die 56 from position III to IV, die 55 from position II to III, die 54 from position I to II and die 53 to position I. Upon die 50 reaching position VI, plunger 226 is actuated upwardly to operative position to press against base of partially compressed element W and a plunger 224 having a pilot plunger is lowered into die 50 and further compresses element W to the required density. Then the plungers 224 and 226 are retracted from die 50 leaving the element W self-retained in bore B and the table 45 is ready for the next indexing. As this action was taking place with respect to die 50 at position VI, die 57 was acted upon at position V in the same manner as was die 50 when at that position, die 56 was acted upon at position IV in the same manner as were dies 50 and 57 when at that position, die 55 was acted upon at position III in the same manner as were dies 50, 57 and 56 when at that position, die 54 was acted upon at position II in the same manner as were dies 50, 57, 56 and 55 when at that position and die 53 was acted upon at position I in the same manner as were dies 50, 57, 56, 55 and 54 when at that position.

The index table 45 is again indexed 45° to move die 50 from position VI to VII, die 57 from position V to VI, die 56 from position IV to V, die 55 from position IV to V, die 54 from position III to IV, die 53 from position II to III, die 52 from position I to II and die 51 to position I. Upon reaching position VII, an ejecting plunger 227 enters die 50 and pushes the finished tampon out of the die 50 on to the traveling belt 4. While die 50 is being acted upon at station VII, die 57 was acted upon at station VI in the same manner as was die 50 when at that station, die 56 at station V was acted upon in the same manner as were dies 50 and 57 when at that station, die 55 was acted upon at station IV in the same manner as were dies 50, 57 and 56 when at that station, die 54 was acted upon at station III in the same manner as were dies 50, 57, 56 and 55 when at that station, die 53 was acted upon at station II in the same manner as were dies 50, 57, 56, 55 and 54 when at that station, die 52 was acted upon at station I in the same manner as were dies 50, 57, 56, 55, 54 and 53 when at that station.

Then the index table 45 again indexes 45° to move the die 50 to inoperative or blank position VIII which completes the cycle, with die 57 being at position VII, die 56 at position VI, die 55 at position V, die 54 at position IV, die 53 at position III, die 52 at position II and die 51 at position I. Thus by the intermittent rotation of the table 45, each die is indexed in a recurring series of different positions.

The inserting plunger L, the partial compression plunger 221, the final compression plunger 224 and the ejector plunger 227 are always located or in line with respective positions I, V, VI and VII and are carried by the reciprocating plunger head 68. The head 68 is reciprocated vertically by the vertically reciprocating shafts 67 and 72 actuated by the continuously driven pivoted counterweight 75.

The apparatus shown in the drawings and described herein requires no manual labor in its operation once a circuit is made to operate the motor drive 14 which is the original drive for automatically operating all of the movable parts which are so arranged as shown to operate automatically and in timed relationship with respect to each other as described. By employing this completely automatic apparatus a web of absorbent fibrous material is fed at the intake of the machine and finished tampons are deposited in container for packing.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

I claim:
1. The method of making a tampon comprising preforming and partially compressing a web of absorbent, fibrous material into a relatively loosely compacted and relatively long substantially cylindrical formation compared to the corresponding characteristics of a finished tampon and thereafter coupling a draw cord therewith and longitudinally compressing said cylindrical formation.

2. The method of making a tampon comprising preforming and partially compressing a web of absorbent, fibrous material into a substantially U-shaped loosely compacted substantially cylindrical formation, with the legs of said U being substantially alike, thereafter threading a draw cord through said cylinder near the loop of the U.

3. The method of making a tampon comprising preforming a web of fibrous, absorbent material into a substantially U-shaped loosely compacted substantially cylindrical formation whose outer diameter is that of the finished tampon, spreading from each other a portion of the legs of the U near the loop of the U to provide a cord insertion opening therethrough, threading a draw cord through said opening and compressing said cylindrical formation.

4. The method comprising feeding a web of absorbent fibrous material, separating a length of said web from the remainder thereof, preforming said length of said web into a loosely compacted substantially cylindrical formation whose diameter is approximately that of the finished tampon and whose length is materially greater than that of the finished tampon, thereafter threading a looped draw cord therethrough, tying said cord therewith and longitudinally compressing said cylindrical formation having said cord coupled therewith.

5. The method comprising feeding a web of absorbent fibrous material along a predetermined path, folding over on a common face thereof the longitudinal marginal portions thereof, separating a predetermined length of said folded web from the remainder thereof, preforming said predetermined length into a loosely compacted and substantially cylindrical formation with folded over marginal portions located inside the outer periphery of said cylinder, coupling a draw cord therewith and compressing said cylinder.

6. A tampon machine comprising a die for carrying tampon material, means for supporting said die, means for moving said die in a recurring series of different positions, means for inserting said material in said die, means for longitudinally compressing the material carried by said die in at least one of said positions and means for coupling a draw cord with the material carried by said die to another position.

7. A tampon machine comprising a die for carrying tampon material, means for supporting said die, means for moving said die in a recurring series of different positions, means for inserting said material into said die at one position, means for threading a draw cord through said material while carried by said die at another position and means for longitudinally compressing said material while in said die at still another position.

8. A tampon machine including a die having a transverse opening, a support for said die, means for moving said die in a predetermined path, means for placing a string in the said path and means for inserting one end of said string through said opening in said die.

9. A tampon machine including a die having a transverse opening, means for moving said die in a predetermined path, means for placing a loop string in the path of said die, and means for inserting the free ends of said loop string through said die and the loop of said string.

10. A tampon machine including a die having a transverse opening, means for moving said die in a predetermined path, a source of string, means for drawing a length of said string from said source in a two legged loop across said path, means for inserting the free ends through the opening in said die and through the loop end thereof.

11. In the method of making a tampon the steps of moving a fibrous absorbent material of generally cylindrical formation in a predetermined path, forming a length of string in a two legged loop across said path while maintaining said loop open to receive the free ends of said string, inserting the free ends of said string through said cylindrical formation and through said loop.

12. In the method of making a tampon the steps of moving a fibrous absorbent material of generally cylindrical formation in a predetermined path, forming a length of string in a two legged loop across said path while maintaining said loop open to receive the free ends of said strings, inserting the free ends of said string through said cylindrical formation and through said loop and tightening the knot formed thereby.

13. In the method of making a tampon the steps of moving a fibrous absorbent material of generally cylindrical formation in a predetermined path, forming a length of string in a two legged loop across said path, inserting the free ends of said string through said cylindrical formation and through said loop and repositioning the knot formed thereby.

14. In the method of making a tampon the steps of moving a fibrous absorbent material of generally cylindrical formation in a predetermined path, forming a length of string in a two legged loop across said path, inserting the free ends of said string through said cylindrical formation and through said loop and repositioning and tighting the knot formed thereby.

15. A tampon machine comprising means for folding a web of fibrous material, means adjacent the folding means for separating a length of said folded web from the remainder thereof, a plurality of dies positioned to receive the separated folded web in one position, means for supporting said dies in fixed space relationship to each other, means for moving said dies to a recurring series of different positions and means adjacent the receiving position of dies for inserting said length of folded web into the die in web receiving position.

16. A tampon machine comprising a die for carrying tampon material, means for supporting said die, means associated with said die supporting means to intermittently move said supporting means and die to a recurring series of different positions, means adjacent one position of said die to insert tampon material therein, means adjacent a die position for inserting a draw cord through said material while in said die, means adjacent a die position for tying said cord to said material while in said die and means adjacent a die position and cooperating with said die for compressing said material while in said die.

17. A tampon machine comprising means for feeding a web of fibrous, absorbent material, means adjacent the feeding means for separating a predetermined length of said material from the remainder thereof, a die positioned to receive said length of material in one position, means for supporting said die, means associated with said die supporting means to intermittently move said supporting means and said die to a recurring series of different positions, means adjacent the material receiving position of said die to insert said length of material in said die, means adjacent one of said die positions for inserting a draw cord through said material, means adjacent one of said die positions for tying said cord to said material and means adjacent one of said die positions and cooperating with said die for compressing said material.

18. A tampon machine comprising means for feeding a web of fibrous, absorbent material, means adjacent the feeding means for separating a predetermined length of said material from the remainder thereof, a die positioned to receive said length of material in one position, means for supporting said die, means associated with said die supporting means to intermittently move said supporting means and said die to a recurring series of different positions, means adjacent the material receiving position of said die to insert said length of material in said die, means adjacent one of said die positions and cooperating with an opening in said die for making an opening through the thickness of said material, means adjacent one of said die positions for inserting a draw cord through said opening in said die and said material, means adjacent one of said die positions for tying said cord to said material and means adjacent one of said die positions and cooperating with said die for compressing said material.

19. A tampon machine comprising a first feeding means for intermittently feeding a web of fibrous material, a second feeding means spaced from said first feeding means and being continuously operative to move the web at the same speed as the first feeding means when said first feeding means is operative, a folding means positioned adjacent said first feeding means for folding a predetermined length of said web whose magnitude is determined by the conjoint period of movement of said first and second feeding means, a die positioned to receive the folded length of web and means adjacent said die for inserting said folded length of web in said die.

20. A tampon machine comprising a first feeding means for intermittently feeding a web of fibrous material, a second feeding means spaced from said first feeding means and being continuously operative to move the web at the same speed as the first feeding means when said first feeding means is operative, a folding means positioned adjacent said first feeding means for folding a predetermined length of said web whose magnitude is determined by the conjoint period of movement of said first and second feeding means, a plurality of dies positioned to receive the length of folded web in one position, means for supporting said dies in fixed spaced relationship to each other, means for moving said dies to a recurring series of different positions and means adjacent the receiving position of the dies for inserting said length of folded web into the die in web receiving position.

21. A tampon machine including a die having a transverse opening, means for moving said die in a predetermined path, a source of string, means for drawing a length of string from said source in a two legged loop across said path, means for moving the free ends of said loop together, and means for inserting the free ends through the opening in said die and through the loop end thereof.

22. A tampon machine including a die having a transverse opening, means for moving said die in a predetermined path, a source of string, means for drawing a length of string from said source in a two legged loop across said path, means for moving the free ends of said loop together, means for spreading the loop, and means for inserting the free ends through the opening in said die and through the loop end thereof.

23. In the method of making a tampon the steps of moving the fibrous absorbent material of generally cylindrical formation in a predetermined path, forming a length of string in a two legged loop across said path, maintaining the movement of the material to partially wrap the loop circumferentially about the cylindrical formation of material, inserting the free ends of string through said cylindrical formation and through said loop, tightening the knot formed thereby and moving the partially circumferentially wrapped portion of the loop over the end of the cylindrically formed material.

24. The method of making a tampon comprising preforming a web of fibrous absorbent material into a substantially U-shaped loosely compacted substantially cylindrical formation whose outer diameter is that of the finished tampon, separating from each other a portion of the legs of the U to provide a string insertion opening therefor, forming a length of the string in a two-legged loop across said formation while maintaining said loop open to receive the free ends of said string, threading said string through said opening and compressing said cylindrical formation.

25. The method of making a tampon comprising preforming a web of fibrous absorbent material into a substantially U-shaped loosely compacted substantially cylindrical formation whose outer diameter is that of the finished tampon, separating from each other a portion of the legs of the U near the loop of the U to provide a string insertion opening therefor, forming a length of the string in a two-legged loop across said formation while maintaining said loop open to receive the free ends of said string, threading said string through said opening, compressing said cylindrical formation and tightening the knot formed.

26. A tampon machine comprising a die for carrying tampon material, means for supporting said die, means for moving said die in a recurring series of different positions, means for inserting said material into said die at one position, means for threading a draw cord through said material while carried by said die at another position and plunger means cooperating with said die for longitudinally compressing said material while in said die at still another position.

HENRY GANZ.

REFERENCES CITED

The following references are of record in the file of this patent:

UNITED STATES PATENTS

| Number | Name | Date |
|---|---|---|
| 228,017 | Aston et al. | May 25, 1880 |
| 749,220 | Pond | Jan. 12, 1904 |
| 834,756 | Robbins | Oct. 30, 1906 |
| 1,038,853 | Coleman | Sept. 17, 1912 |
| 1,728,273 | Hall | Sept. 17, 1929 |
| 1,781,688 | Henderson | Nov. 18, 1930 |
| 2,076,389 | Voss | Apr. 6, 1937 |
| 2,099,931 | Fourness | Nov. 23, 1937 |
| 2,152,493 | Newman | Mar. 28, 1939 |
| 2,286,817 | Knight | June 16, 1942 |
| 2,284,072 | Schmidt | May 26, 1942 |
| 2,330,257 | Bailey | Sept. 28, 1943 |
| 2,340,311 | Donovan | Feb. 1, 1944 |
| 2,347,439 | Shea | Apr. 25, 1944 |

Certificate of Correction

February 22, 1949.

Patent No. 2,462,178.

HENRY GANZ

It is hereby certified that error appears in the printed specification of the above numbered patent requiring correction as follows:

Column 15, line 31, claim 12, for the word "strings" read *string*; and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*